United States Patent
Williams et al.

(10) Patent No.: US 10,539,313 B2
(45) Date of Patent: Jan. 21, 2020

(54) VEHICLE LIGHTING ASSEMBLIES AND MODULES

(71) Applicant: Ford Global Technologies, LLC, Dearborn, MI (US)

(72) Inventors: Bruce Preston Williams, Grosse Pointe Park, MI (US); Arun Kumar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/012,068

(22) Filed: Jun. 19, 2018

(65) Prior Publication Data

US 2019/0383480 A1    Dec. 19, 2019

(51) Int. Cl.
| | |
|---|---|
| *B60Q 1/00* | (2006.01) |
| *F21V 29/71* | (2015.01) |
| *F21S 41/147* | (2018.01) |
| *F21V 29/502* | (2015.01) |
| *F21S 41/24* | (2018.01) |
| *F21S 45/48* | (2018.01) |
| *F21Y 115/10* | (2016.01) |

(52) U.S. Cl.
CPC .......... *F21V 29/713* (2015.01); *F21S 41/147* (2018.01); *F21S 41/24* (2018.01); *F21S 45/48* (2018.01); *F21V 29/502* (2015.01); *F21Y 2115/10* (2016.08)

(58) Field of Classification Search
CPC .... F21V 29/713; F21V 29/502; F21S 41/147; F21S 41/24; F21S 45/48; F21Y 2115/10
See application file for complete search history.

(56) References Cited

U.S. PATENT DOCUMENTS

| | | | | |
|---|---|---|---|---|
| 3,485,553 | A * | 12/1969 | Lee | G02F 1/29 359/315 |
| 7,344,289 | B2 * | 3/2008 | Fallahi | F21V 29/505 362/547 |
| 7,618,171 | B2 | 11/2009 | Tessnow et al. | |
| 8,061,868 | B2 * | 11/2011 | Dubord | B60Q 1/24 362/232 |
| 8,523,416 | B2 * | 9/2013 | Ohmi | B60Q 1/076 362/538 |
| 8,733,996 | B2 | 5/2014 | Kishimoto | |
| 8,801,251 | B2 * | 8/2014 | Ohmi | B60Q 1/076 362/538 |
| 9,528,680 | B2 | 12/2016 | Zorn | |
| 9,958,116 | B2 * | 5/2018 | Cai | F21V 3/02 |

(Continued)

FOREIGN PATENT DOCUMENTS

| | | |
|---|---|---|
| CN | 106678696 A | 5/2017 |
| CN | 107514592 A | 12/2017 |
| JP | 5525639 B1 | 11/2014 |

*Primary Examiner* — Tracie Y Green
(74) *Attorney, Agent, or Firm* — Vichit Chea; Price Heneveld LLP (57) ABSTRACT

A vehicle lighting assembly is provided that comprises a single heat sink defining a plurality of cavities. The heat sink is within, and movable relative to, a housing. The vehicle lighting assembly further comprises a plurality of optic polyhedrons configured within the cavities and a plurality of LED light sources within the cavities is configured to direct an incident light pattern through the optic polyhedrons to generate a plurality of vehicular light patterns.

14 Claims, 10 Drawing Sheets

(56) References Cited

U.S. PATENT DOCUMENTS

| | | | | |
|---|---|---|---|---|
| 2008/0144329 A1* | 6/2008 | Okuda | .................. | B60Q 1/076 |
| | | | | 362/539 |
| 2013/0051059 A1* | 2/2013 | Abai | ...................... | B60Q 1/068 |
| | | | | 362/523 |
| 2015/0078029 A1* | 3/2015 | Kumar | ................. | F21S 41/143 |
| | | | | 362/522 |
| 2018/0266669 A1* | 9/2018 | Mochizuki | ............ | F21V 29/503 |

* cited by examiner

VEHICLE LIGHTING ASSEMBLIES AND MODULES

FIELD OF THE INVENTION

The present invention generally relates to vehicle lighting assemblies and, more particularly, to vehicle light assemblies providing high-beam, low-beam, and daytime running light patterns.

BACKGROUND OF THE INVENTION

Vehicle headlamp systems employing a plurality of beam patterns offer a unique and attractive viewing experience and to address multiple lighting and visibility functions. It is therefore desired to implement a plurality of dynamic beam patterns in automotive vehicles for various lighting application and vehicle functions.

SUMMARY OF THE INVENTION

According to one aspect of the present invention, a vehicle lighting assembly is provided that comprises a single heat sink defining a plurality of cavities. The heat sink is within, and movable relative to, a housing. The lighting assembly also includes a plurality of optic polyhedrons configured within the cavities. The lighting assembly further includes a plurality of light emitting diode (LED) light sources within the cavities configured to direct an incident light pattern through the optic polyhedrons to generate a plurality of vehicular light patterns.

Embodiments of the first aspect of the invention can include any one or a combination of the following features:
- the heat sink is configured to dissipate thermal energy from the LED light sources in both vehicle forward and rearward directions;
- the heat sink comprises a visible outer edge that extends past the cavities vehicle forward;
- the vehicular light patterns are a low-beam pattern, a high-beam pattern, and a daytime running light pattern;
- the optic polyhedrons that generate the low-beam pattern and the high-beam pattern also collectively generate the daytime running light pattern;
- each optic polyhedron comprises a front side comprising a plurality of micro-optic elements, and further wherein each micro-optic element comprises a front face having a surface area from about 0.25 millimeters squared to about 25 millimeters squared;
- each optic polyhedron comprises a plurality of near-field lens (NFL) elements configured to collimate the incident light pattern into the vehicular light patterns;
- the heat sink defines an open end, and further wherein a lens is disposed over the open end; and/or
- the optic polyhedrons and the plurality of micro-optic elements are formed of silicone.

According to a second aspect of the present invention, a vehicle lighting assembly is provided that comprises a first housing defining a plurality of cavities and received by a second housing. The vehicle lighting assembly further comprises a plurality of optic polyhedrons and corresponding LED light sources configured within the cavities. The plurality of LED light sources direct incident light patterns through the polyhedrons to generate a plurality of vehicular light patterns. The first housing is movable relative to the second housing to calibrate each of the vehicular light patterns.

Embodiments of the second aspect of the invention can include any one or a combination of the following features:
- each optic polyhedron comprises a plurality of near-field lens (NFL) elements configured to collimate the incident light pattern into the vehicular light patterns;
- the optic polyhedrons are formed of silicone;
- the plurality of vehicular light patterns are a low-beam pattern and a high-beam pattern, as set forth in the current U.S. Federal Motor Vehicle Safety Standard 108;
- each optic polyhedron comprises a front side comprising a plurality of micro-optic elements, and further wherein each micro-optic element comprises a front face having a surface area from about 0.25 millimeters squared to about 25 millimeters squared; and/or
- the first housing defines an open end, and further wherein a lens is disposed over the open end.

According to a third aspect of the present invention, a vehicle lighting assembly is provided that comprises a single heat sink defining a plurality of cavities within a housing. The vehicle lighting assembly further comprises a plurality of optic polyhedrons and corresponding LED light sources are within the cavities. The LED light sources direct incident light patterns through the polyhedrons to generate a plurality of vehicular light patterns. The heat sink is movable relative to the housing to calibrate one or more of the vehicular light patterns.

Embodiments of the third aspect of the invention can include any one or a combination of the following features:
- the heat sink comprises a visible outer edge that extends past the cavities vehicle forward;
- the vehicular light patterns comprise a low-beam pattern, a high-beam pattern, and a daytime running light pattern, and the optic polyhedrons that generate the low-beam pattern and the high-beam pattern also collectively generate the daytime running light pattern;
- the low-beam pattern and the high-beam pattern meet respective the low-beam pattern requirements and high-beam pattern requirements set forth in the current U.S. National Highway Traffic Safety Administration Federal Motor Vehicle Safety Standard 108; and/or
- each optic polyhedron comprises a front side comprising a plurality of micro-optic elements, and further wherein each micro-optic element comprises a front face having a surface area from about 0.25 millimeters squared to about 25 millimeters squared.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
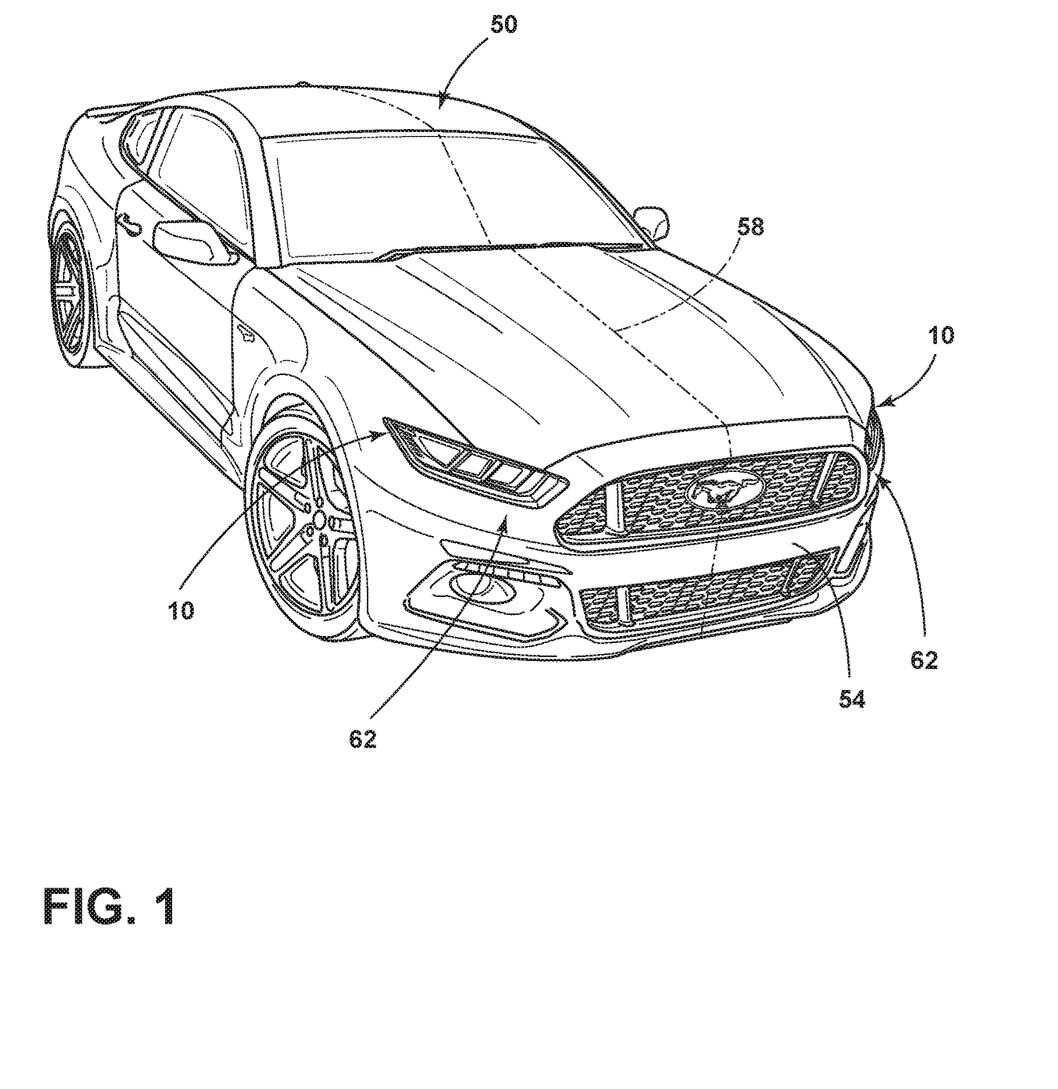
FIG. 1 is a front perspective view of a vehicle including a vehicle lighting assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

The following disclosure describes a vehicle lighting assembly having a first housing and a second housing. In some examples, the first housing may be a heat sink. The first housing defines a plurality of cavities configured to receive a plurality of lens modules, or optic polyhedrons. Light sources are disposed within each of the cavities and produce an incident light pattern toward an input surface of each of the lens modules. The incident light pattern is collimated and exits an exit surface of each of the lens modules. The first housing is movable within the second housing to calibrate a low-beam pattern from the collimated incident light exiting the exit surfaces. A high-beam pattern may be subsequently calibrated. The lens modules may further be used to produce a daytime running light pattern.

Referring to FIGS. 1-12, reference numeral 10 generally denotes a vehicle lighting assembly that comprises a single heat sink 14 defining a plurality of cavities 18*a*, 18*b*, 18*c*. The heat sink 14 is received by, and movable relative to, a housing, or bezel, 20 (see FIGS. 6-8 and corresponding description below). A plurality of optic polyhedrons, or lens modules, 24*a*, 24*b*, 24*c* is configured within the cavities 18*a*, 18*b*, 18*c*. A plurality of LED light sources 28 within the cavities 18*a*, 18*b*, 18*c* configured to direct an incident light pattern 32 through the optic polyhedrons, or lens modules, 24*a*, 24*b*, 24*c* to generate a plurality of vehicular light patterns 180, 190, 200 (see FIGS. 9-11 and corresponding description below).

Referring now to FIG. 1, a front view of a vehicle 50 is shown including a pair of the vehicle lighting assemblies 10. The vehicle lighting assemblies 10 are installed in a front portion 54 of the vehicle 50 on either side of a longitudinal centerline 58 of the vehicle 50 to form a vehicle headlamp system 62. In particular, the vehicle lighting assemblies 10 may provide the following lighting functions: a front turn signal (e.g., illuminated with a yellow or amber light when turn signals or hazard button is activated), a daytime running light function (e.g., fully illuminated with a DRL intensity light), a low-beam light function (e.g., partially illuminated with a full low beam intensity and, in some examples, partially illuminated with DRL intensity), and a high-beam light function (e.g., fully illuminated with a full high beam intensity light). The vehicle lighting assemblies 10 are described in further detail in later sections of this specification.

Figure 2:
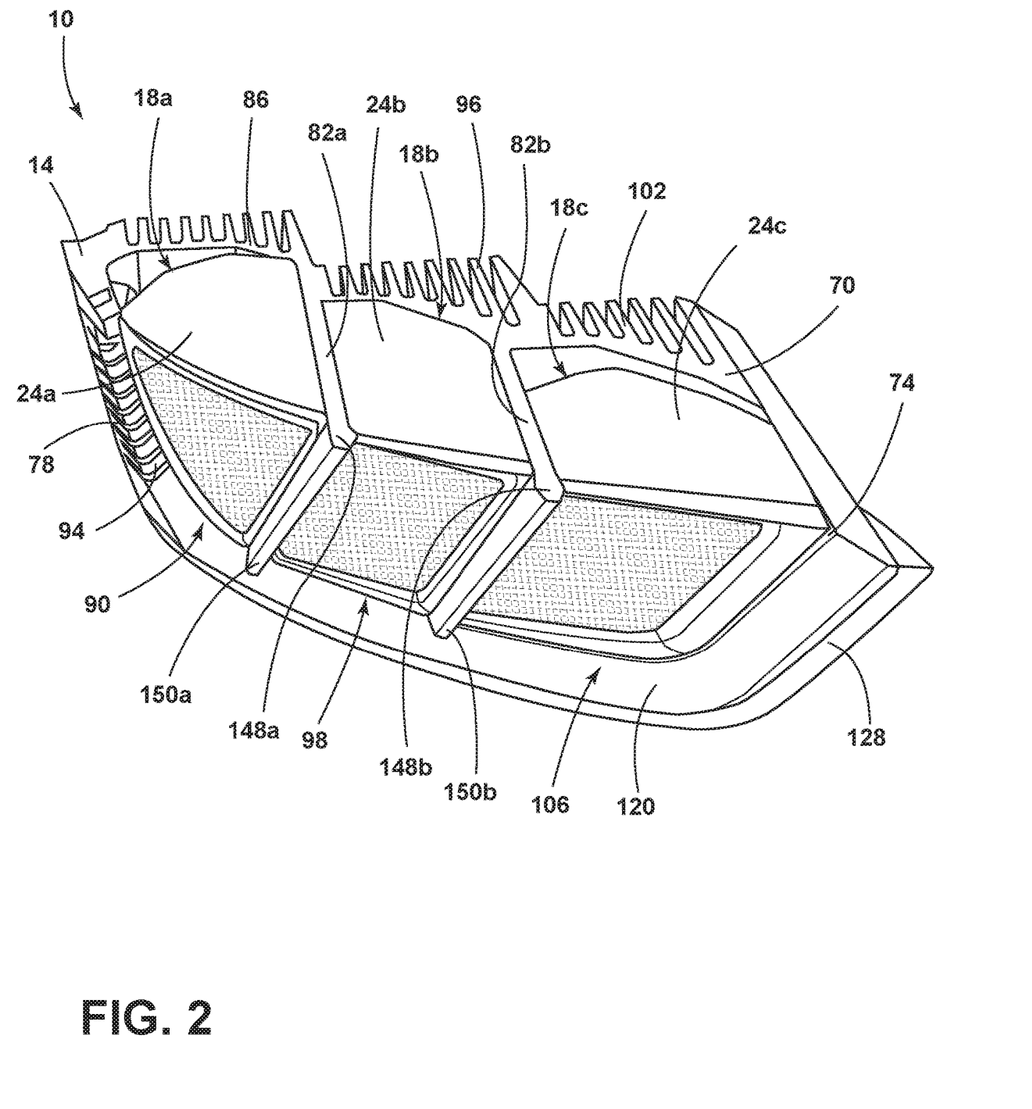
FIG. 2 is a top perspective view of a heat sink and housing of the vehicle lighting assembly depicted in FIG. 1.
Figure 3:
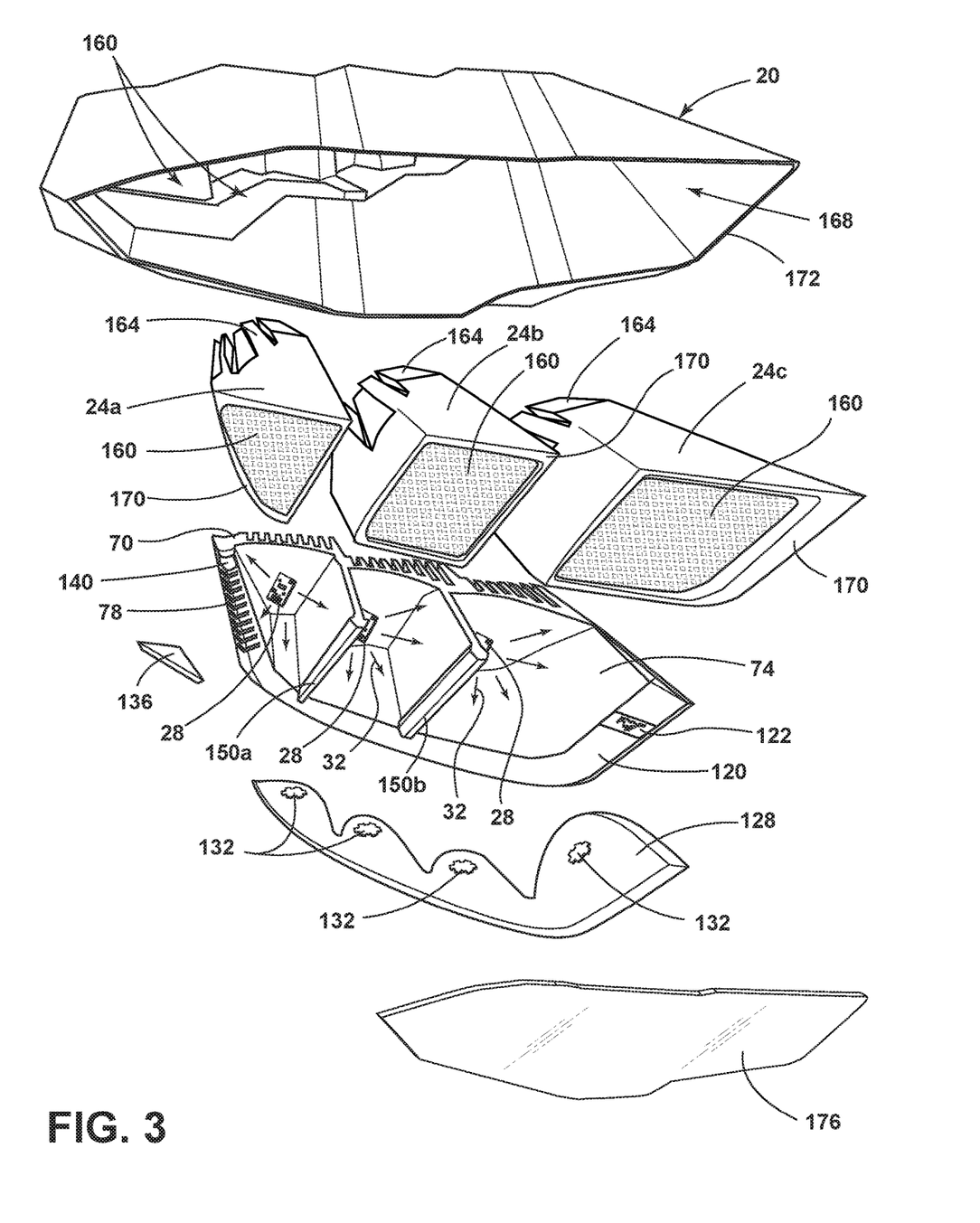
FIG. 3 is an exploded view of the heat sink and housing depicted in FIG. 2.

Referring now to FIGS. 2 and 3, the heat sink 14 defines the plurality of cavities 18*a*, 18*b*, 18*c* and is configured to dissipate thermal energy from the plurality of LED light sources 28 disposed within the cavities 18*a*, 18*b*, 18*c* in both vehicle forward and rearward directions. The heat sink 14 includes a rear wall 70 integrally formed with a bottom wall 74 and a side wall 78. The rear wall 70 and the bottom wall 74 are further integrally formed with a plurality of dividing walls 82*a*, 82*b* extending from the rear wall 70.

The bottom wall 74 and the side wall 78 of the heat sink 14 include a continuous, non-linear outer edge 120 extending past the plurality of cavities 18*a*, 18*b*, 18*c* and visible vehicle forward. In some examples, an indicium 122 may be positioned on the outer edge 120 and visible from vehicle forward. The outer edge 120 and the bottom wall 74 may define a slot 124 (see FIG. 11) positioned beneath the cavities 18*a*, 18*b*, 18*c* configured to receive a light blade 128. The light blade 128 is configured to function as a turn signal when illuminated by a light blade light source 132 (see also FIG. 11). In some examples, the light blade light source 132 can be selected from various LED lighting technologies, including those that can emanate light of wavelengths other than in the visible spectrum or various colors. In other examples, the light blade light source 132 may be, for example, a halogen bulb, an organic light emitting diode, a high intensity discharge bulb, etc. In some examples, other slots may be formed in the bottom wall 74 or the side wall 78 to receive other light blades, such as, for example, a marker light blade 136 received by a marker slot 140 positioned in the side wall 78, as shown in FIG. 3. The marker light blade 136 may be illuminated by one of the plurality of LED light sources 28 within the cavities 18*a*, 18*b*, 18*c*, as shown in FIG. 3, or the marker light blade 136 may alternatively be illuminated by a separate light source.

A first cavity 18*a* is defined by the side wall 78 and a first dividing wall 82*a* joined by the bottom wall 74 and the rear wall 70. The rear wall 70 forms a first step 86 spanning from the side wall 78 to the first dividing wall 82*a* and positioned to allow an open end 90 of the first cavity 18*a* to be aligned with a front surface 94 of the side wall 78. A second cavity 18*b* is defined by the first dividing wall 82*a* and a second dividing wall 82*b* joined by the bottom wall 74 and the rear wall 70. The rear wall 70 forms a second step 96 spanning from the first dividing wall 82*a* to the second dividing wall 82*b* and positioned to allow an open end 98 of the second cavity 18*b* to be aligned with the open end 90 of the first cavity 18*a*. The bottom wall 74 curves upward to define a third cavity 18*c* with the rear wall 70 and the second dividing wall 82*b*. The rear wall 70 forms a third step 102 spanning from the second dividing wall 82*b* to the bottom wall 74 and positioned to allow an open end 106 of the third cavity 18*c* to be aligned with the open end 90 of the first cavity 18*a* and the open end 98 of the second cavity 18*b*. The alignment of the first cavity 18*a*, the second cavity 18*b*, and the third cavity 18*c* produces the illusion of a continuous front face while still having the cavities 18*a*, 18*b*, 18*c* formed with geometry mirroring the geometry of each of the plurality of lens modules, or optic polyhedrons, 24*a*, 24*b*, 24*c*.

Each of the dividing walls 82*a*, 82*b* includes a protrusion 148*a*, 148*b* positioned forward of the respective dividing wall 82*a*, 82*b* and having a generally polygonal cross-section. Each of the protrusions 148*a*, 148*b* is positioned and configured to secure one of the plurality of lens modules 24*a*, 24*b*, 24*c* within the respective cavity 18*a*, 18*b*, 18*c*. Each of the protrusions 148*a*, 148*b* includes a vertical, outer edge 150*a*, 150*b* viewable from vehicle forward, adding an aesthetic appeal to the vehicle lighting assembly 10. In some examples, it is contemplated that the protrusions 148*a*, 148*b* may have various cross-sectional shapes including square, triangular, or rectangular, depending on the shape of the lens modules 24*a*, 24*b*, 24*c*.

Each of the plurality of cavities 18*a*, 18*b*, 18*c* is configured to receive one of the plurality of lens modules, or optic polyhedrons, 24*a*, 24*b*, 24*c*. Each of the lens modules 24*a*, 24*b*, 24*c* includes an exit surface 160 and an input surface 164. The general shape of the exit surface 160 is dependent on the position and configuration of the individual lens module 24*a*, 24*b*, 24*c*. The lens modules 24*a*, 24*b*, 24*c* are each typically fabricated from one piece of material. In the illustrated examples, each of the lens modules 24*a*, 24*b*, 24*c* is molded from silicone. Lens modules formed of conventional materials, such as polycarbonate or acrylic lens, require a +ve draft angle and result in a range of about three percent to about five percent loss of light. This causes a glare issue and light loss. Molding the lens modules 24*a*, 24*b*, 24*c* from silicone provides a 0-draft material, maximizing the efficiency of the lens modules 24*a*, 24*b*, 24*c* by limiting the creation of non-optical surfaces. This minimizes scatter light and reduces the light loss across the lens module 24*a*, 24*b*, 24*c* and preventing glare. The use of silicone as the material for the lens modules 24*a*, 24*b*, 24*c* also allows finer micro-optic elements 154 to be formed on the exit surface 160 than were possible with conventional materials.

Referring now to FIG. 3, the housing 20 defines a cavity 166 and includes an open end 168. The cavity 166 is configured to receive the heat sink 14 and the plurality of lens modules 24*a*, 24*b*, 24*c*. The housing 20 is shaped to mirror the shape of the heat sink 14 such that the outer edge 120 of the heat sink 14 is flush with an outer rim 172 of the housing 20. The heat sink 14 is movable within the housing 20, as described in more detail later. A lens 176 may be positioned over the open end 168 of the housing 20 to secure the heat sink 14 and the plurality of lens modules 24*a*, 24*b*, 24*c* within the cavity 166. The lens 176 may be operably coupled to the outer rim 172 of the housing 20 and may be formed of an optically translucent material, such as polycarbonate, glass, or other translucent materials.

Referring again to FIGS. 2 and 3, each of the lens modules 24*a*, 24*b*, 24*c* is shaped specifically for the cavity 18*a*, 18*b*, 18*c* configured to receive the lens module 24*a*, 24*b*, 24*c*. Each of the lens modules 24*a*, 24*b*, 24*c*, particularly the exit surface 160, can take on a variety of shapes, including those illustrated in FIGS. 2-5. The first lens module 24*a* has a generally triangular exit surface 160 and cross-sectional shape. Each of the second and third lens modules 24*b*, 24*c* have generally rectangular exit surfaces 160 and cross section. In other examples, the lens modules 24*a*, 24*b*, 24*c* may have exit surfaces 160 and/or cross sections having various shapes, such as a parallelogram, circle, oval, or trapezoid. In some examples, each of the exit surfaces 160 may be surrounded by a front edge 170. When the lens modules 24*a*, 24*b*, 24*c* are received by the respective cavities 18*a*, 18*b*, 18*c*, each front edge 170 is positioned substantially flush with the open end 90, 98, 106 of the respective cavity 18*a*, 18*b*, 18*c*. The exterior walls of the lens modules 24*a*, 24*b*, 24*c* may be shaped to accommodate the shape of the input surface 164 and the exit surface 160. Packaging requirements and particular spread and intensity levels required by the final application can also influence the final shape factor chosen for the lens modules 24*a*, 24*b*, 24*c* and the exit surfaces 160.

Each of the plurality of cavities 18*a*, 18*b*, 18*c* includes one of a plurality of LED light sources 28 positioned to illuminate through the open end 90, 98, 106 of the cavity 18*a*, 18*b*, 18*c*. The LED light sources 28 of the vehicle lighting assembly 10 produce the incident light pattern 32 that is generally directed into the input surface 164 of each of the lens modules 24*a*, 24*b*, 24*c*, respectively. Each of the LED light sources 28 may produce an incident light pattern 32 at a daytime running light pattern intensity, a low-beam intensity, and a high-beam intensity, depending on a vehicular light pattern 180, 190, 200 (see FIGS. 9-11) being produced. Each of the LED light sources 28 can be selected from various LED lighting technologies, including those that can emanate light of wavelengths other than in the visible spectrum or various colors. Further, various color filters and other optical elements (e.g., diffusers) can be employed immediately in front of or part of the LED light sources 28 to produce certain desired optical effects associated with the various vehicular light patterns 180, 190, 200 (see FIGS. 9-11). In some examples, the light sources and lens modules 24*a*, 24*b*, 24*c* may be used to produce a cornering function. It should be understood that the LED light sources 28 are located in proximity to the input surfaces 164 to facilitate the efficient collection of incident light by the surfaces 164 of the lens modules 24*a*, 24*b*, 24*c*. It is contemplated that other light sources, for example, OLEDS, a halogen bulb, or a high intensity discharge bulb may be used without departing from the scope of the present disclosure.

Figure 4A:
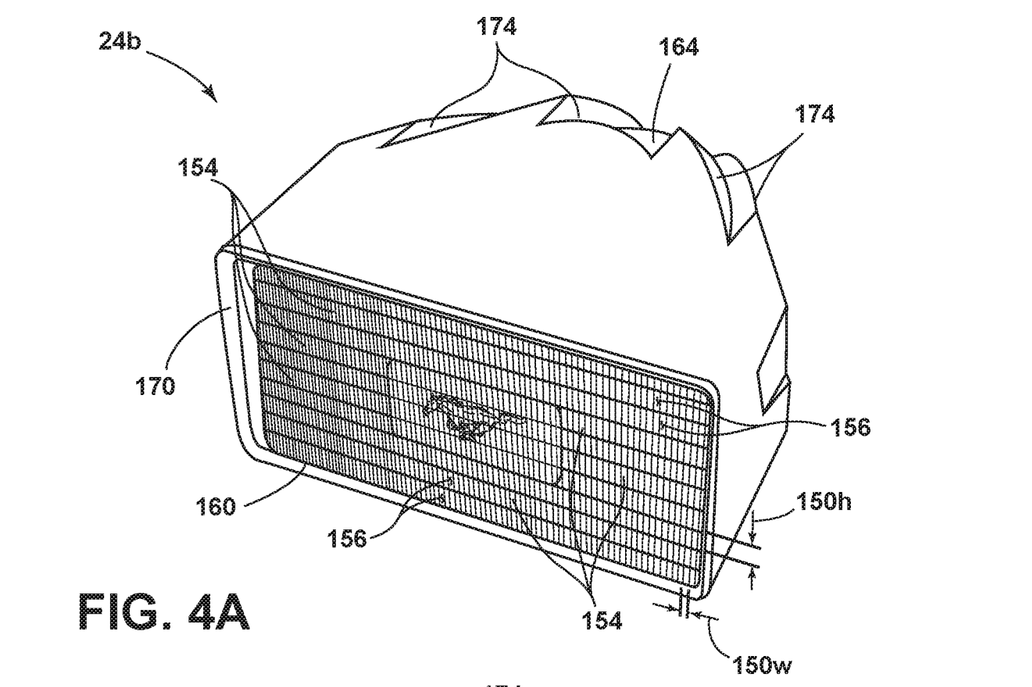
FIG. 4A is a side perspective view of a first lens module.
Figure 4B:
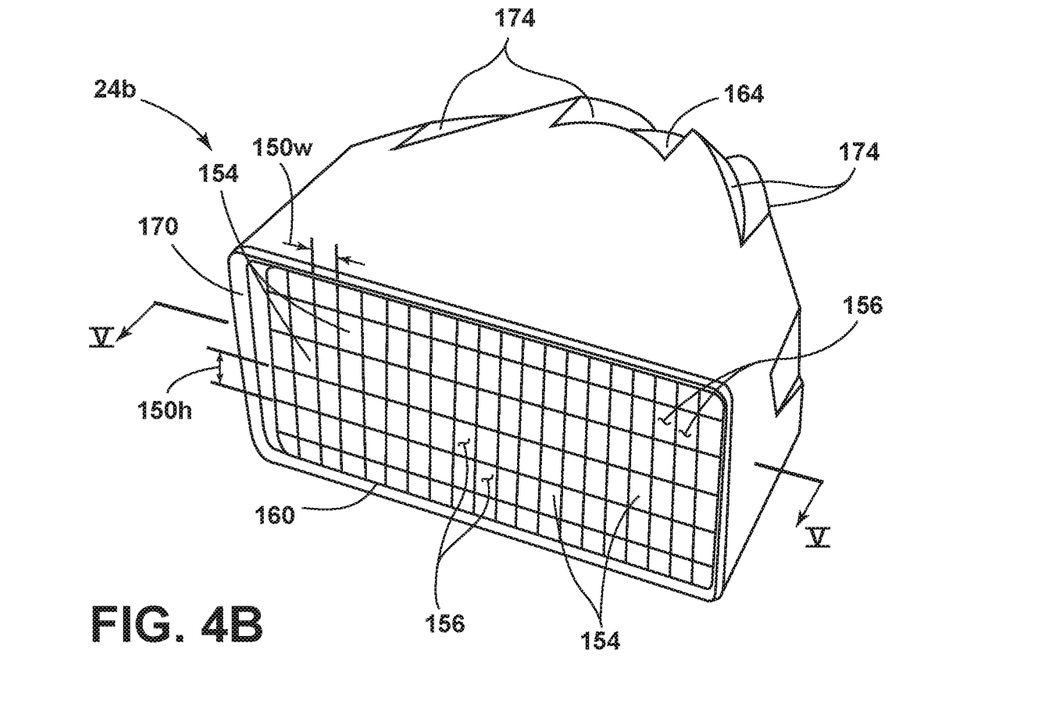
FIG. 4B is a side perspective view of a second lens module.
Figure 5:
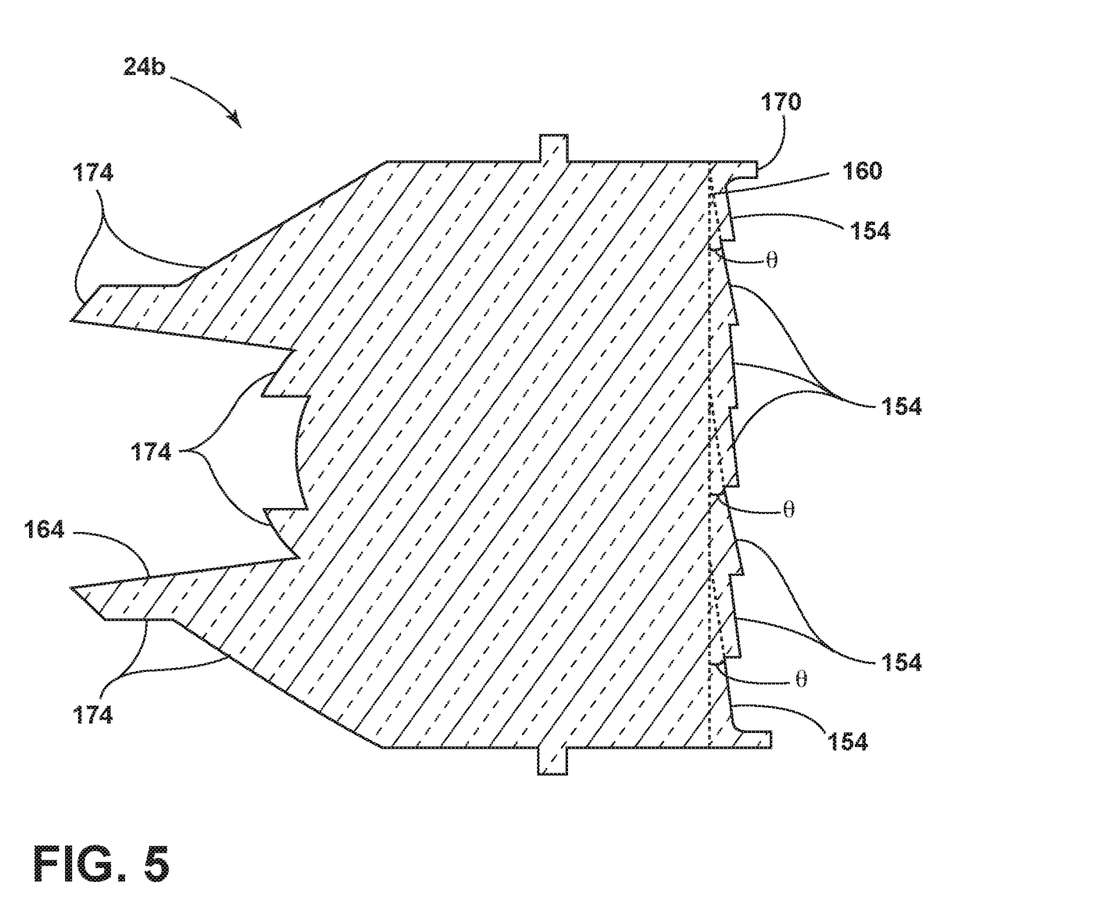
FIG. 5 is a cross-sectional view of the second lens module taken along line V-V of FIG. 4B.
Figure 9:
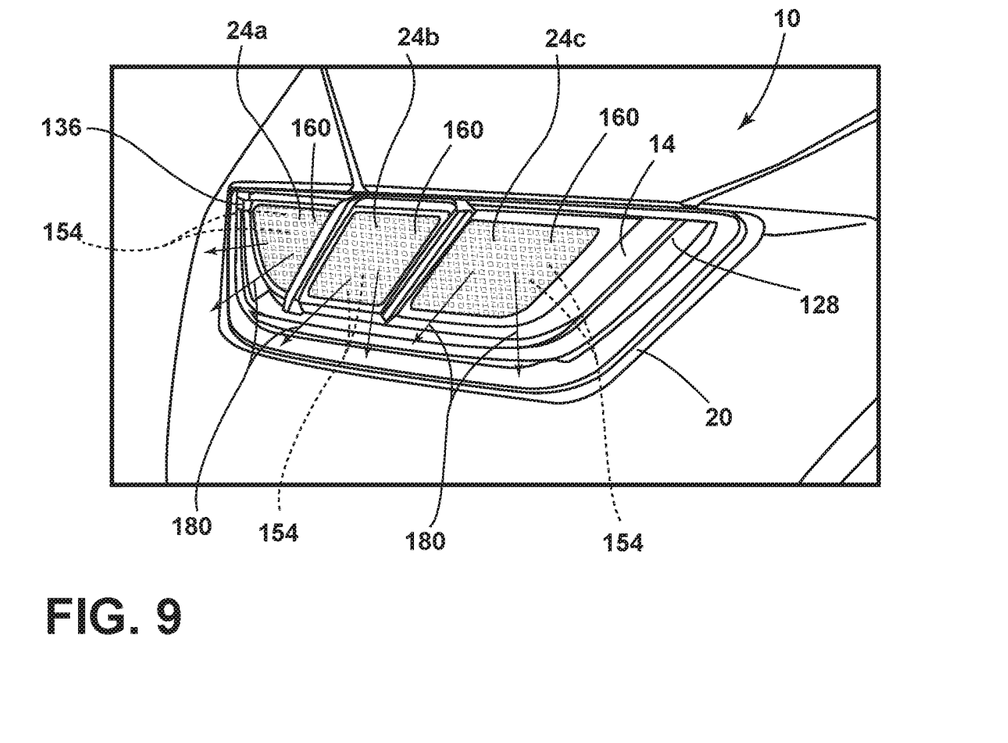
FIG. 9 is a front view of a vehicle lighting module running a day time running light pattern.
Figure 10:
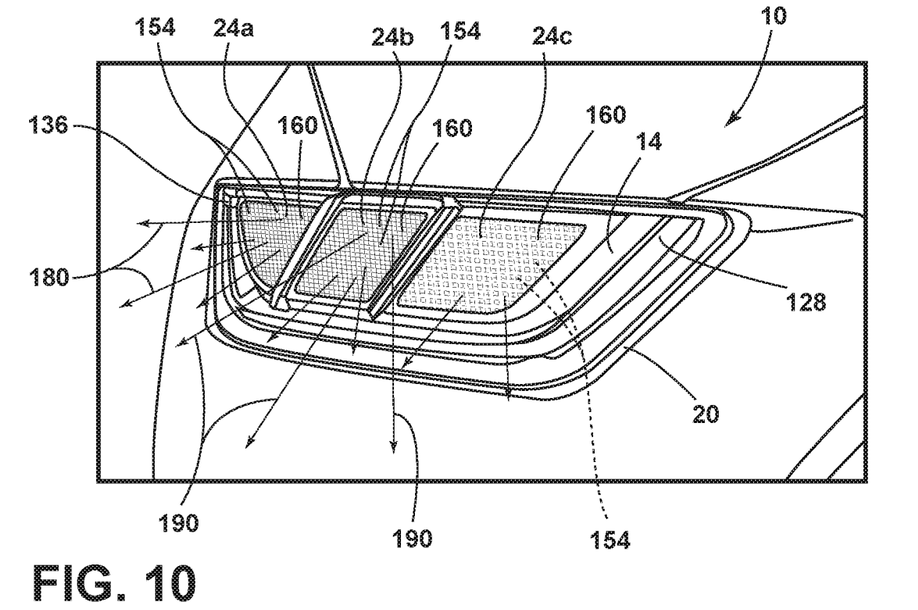
FIG. 10 is a front view of a vehicle lighting module running a low-beam pattern.
Figure 11:
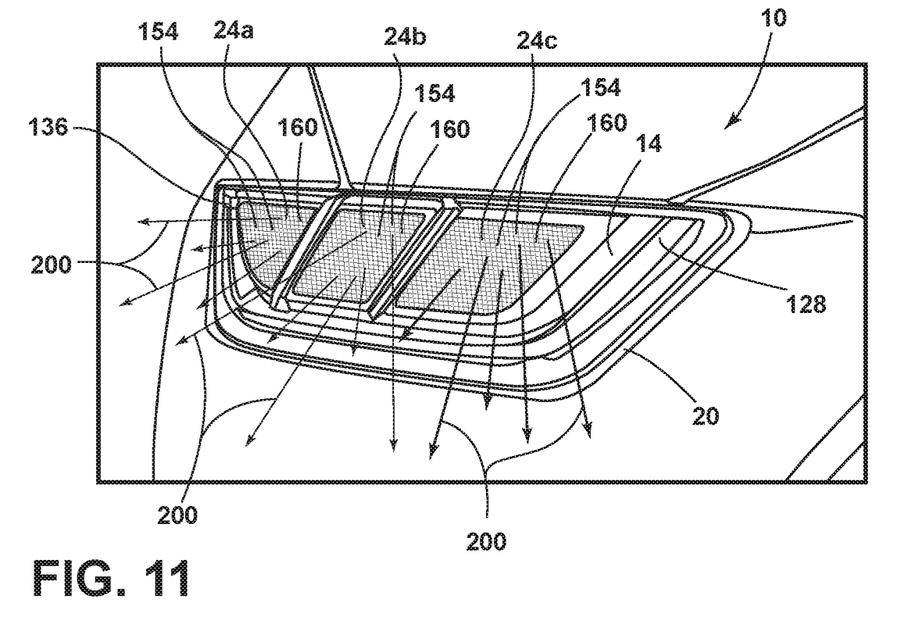
FIG. 11 is a front view of a vehicle lighting module running a high-beam pattern.
Figure 12:
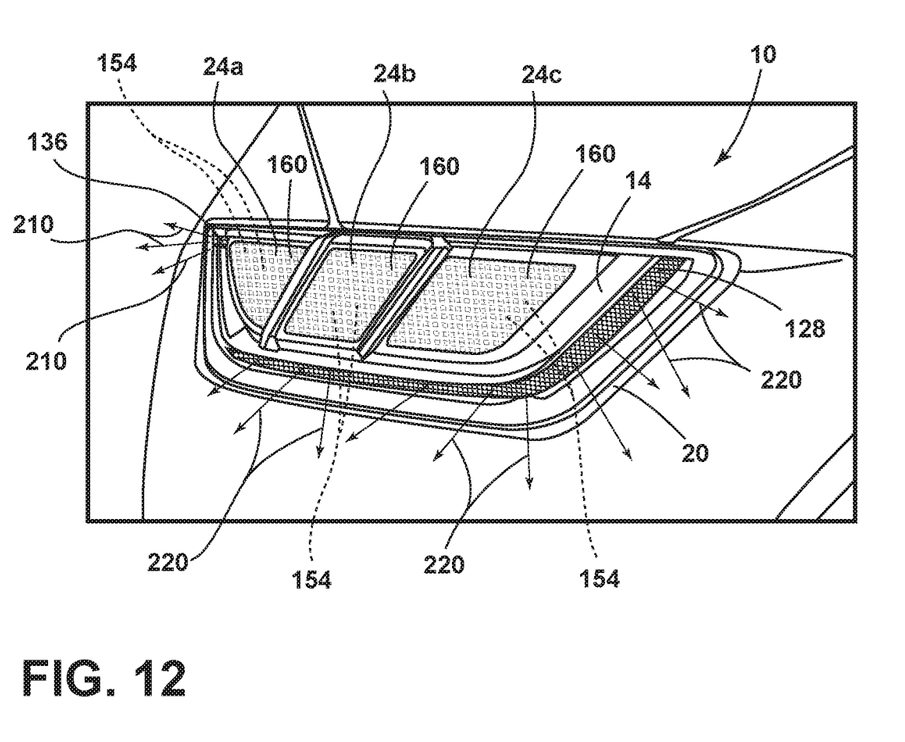
FIG. 12 is a front view of a vehicle lighting module with a turn and marker lights illuminated.

Referring now to FIGS. 3-5, the input surfaces 164 of each lens module 24*a*, 24*b*, 24*c* are each configured according to dimensional and mathematical relationships to collimate the incident light pattern 32 from the LED light sources 28 into vehicular light patterns 180, 190, 200 (see FIGS. 9-11). The input surfaces 164 are generally arranged in a substantially circular or parabolic configuration to efficiently collect the majority of the incident light pattern 32 from the LED light sources 28, as shown in FIG. 5. In some examples, the input surfaces 164 may also be configured in substantially rectangular configurations to accommodate LED light sources 28 that produce an incident light pattern 32 in a substantially linear pattern.

Incident light from LED light sources 28 is usually Lambertian in character with significant scattering in various directions. In other words, light emanates and spreads from the source in all directions—on the order of 180 degrees. The near-field lens (NFL) elements 174 are integrated within each of the lens modules 24*a*, 24*b*, 24*c* and function to collimate the incident light pattern 32 from the LED light sources 28. Each near-field lens element 174 may possess a focal length that differs from the focal lengths of other near-field lens elements 174. As such, these near-field lens elements 174 can work together to collimate the incident light pattern 32 from the LED light sources 28. In some examples, each of the lens modules 24*a*, 24*b*, 24*c* may include more than one grouping of near-field lens elements 174.

Referring now to FIGS. 4A-5, each of the lens modules 24*a*, 24*b*, 24*c* may include a plurality of the micro-optic elements 154 along the exit surface 160. The micro-optic elements 154 are configured to shape the collimated incident light pattern 32 into a particular shape depending on the selected application of vehicle lighting assembly 10. As discussed later, the micro-optic elements 154 are configured to shape the incident light pattern 32 for use as a low-beam pattern 190 (FIG. 10), i.e., a wide pattern directed relatively close to the vehicle lighting assembly 10 when it is arranged in the vehicle headlamp system 62. The micro-optic elements 154 are also a configured to shape the incident light pattern 32 for use as a high-beam pattern 200 (FIG. 11), i.e., a narrow pattern directed farther away from the vehicle 50 than a low-beam pattern 190. Still further, the lens modules 24*a*, 24*b*, 24*c* are configured within vehicle lighting assembly 10 to shape the incident light pattern 32 into a daytime running light pattern 180 (FIG. 9).

As shown in FIGS. 4A and 4B, the micro-optic elements 154 are integrally formed with the exit surface 160 and, in some examples, may be generally square or rectangular. The micro-optic elements 154 may have a height 154*h* ranging from about 0.5 millimeters to about 5 millimeters. The micro-optic elements 154 may also have a width 154*w* ranging from about 0.5 millimeters to about 5 millimeters. The height 154*h* and width 154*w* ranges combine to produce micro-optic elements 154 with front faces 156 having surface areas of approximately 0.25 mm$^2$ to approximately 25 mm$^2$. In some examples, the height to width ratio may be 1:1 (see FIG. 4B). In other examples, the height 154*h* may be greater than the width 154*w* (see FIG. 4A). In still other examples, the width 154*w* may be greater than the height 154*h*. In other examples, the micro-optic elements 154 may be circular in shape with a diameter ranging from about 0.5 millimeters to about 5 millimeters or triangular with any one of the three legs having a length from about 0.5 millimeters to about 5 millimeters.

As shown in FIG. 5, when the micro-optic elements 154 are generally rectangular or square, the front face 156 may be positioned at an angle θ to the exit surface 160. Each micro-optic element 154 may be positioned at a different angle θ within a range from about 0° to about 45°. The angle θ combined with the various surface areas of the front faces 156 provide calculated spread of the incident light pattern 32. Additionally, the micro-optic elements 154 create an aesthetically pleasant glitter effect on the exit surface 160. It is contemplated that the micro-optics 154 may differ in size and/or shape based on the location of the individual micro-optic element 154 on the exit surface 160. The micro-optic elements 154 further provide a uniformly lit front face for the light beam patterns 180, 190, 200.

Figure 6:
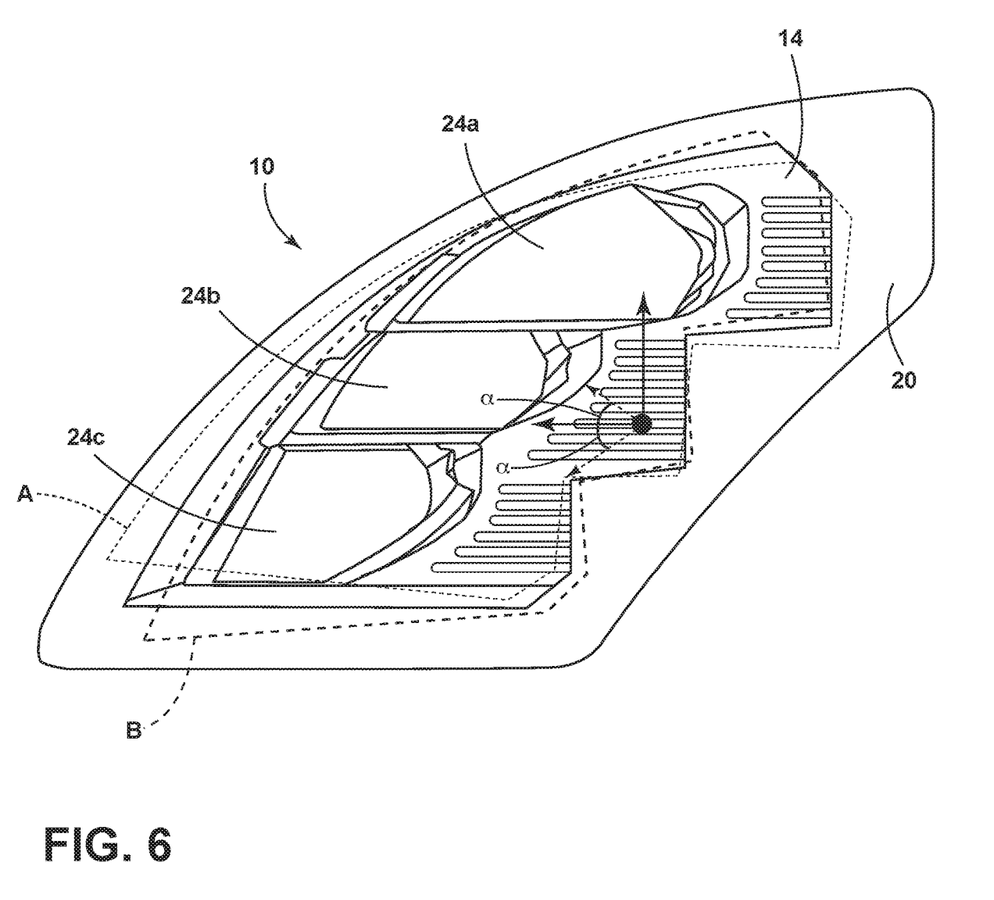
FIG. 6 is a top profile view of a heat sink positioned within a housing illustrating first and second positions of the heat sink within the housing.
Figure 7:
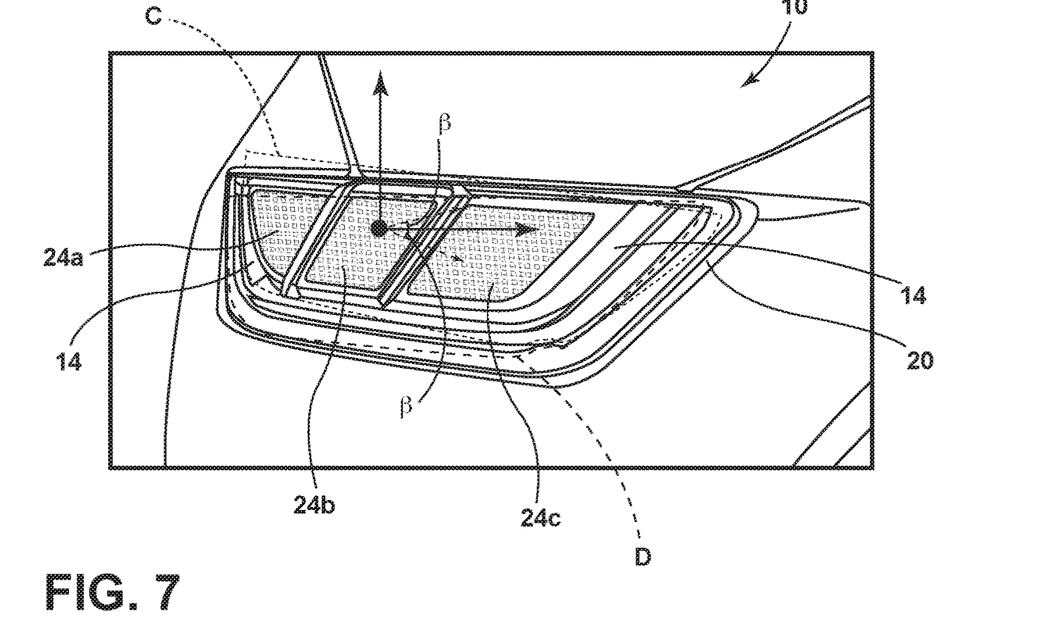
FIG. 7 is a front view of a heat sink positioned within a housing illustrating third and fourth positions of the heat sink within the housing.
Figure 8:
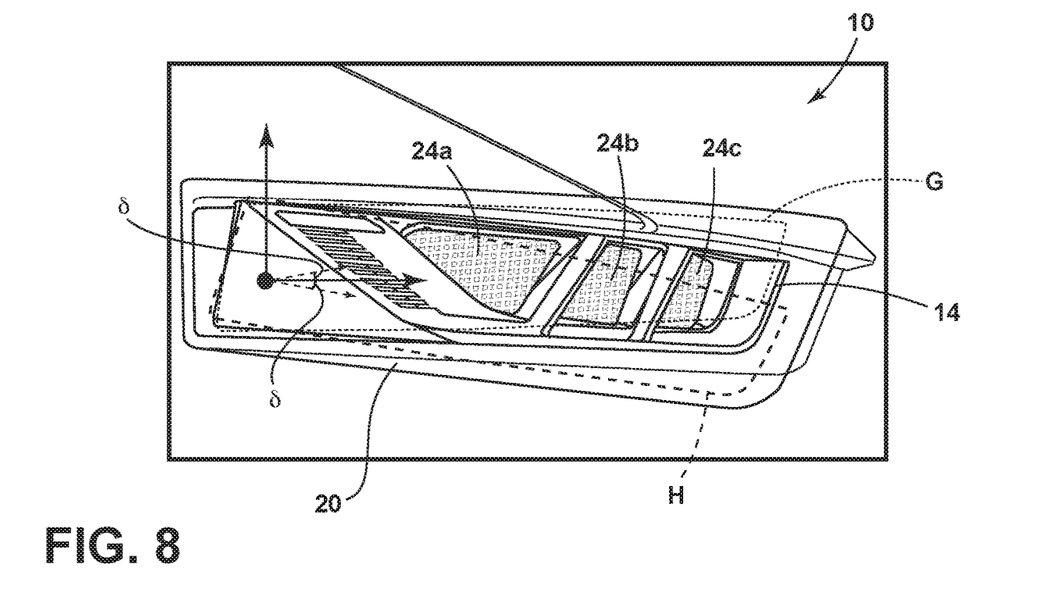
FIG. 8 is a side perspective view of a heat sink positioned within a housing illustrating fifth and sixth positions of the heat sink within the housing.

Referring now to FIGS. 6-8, the heat sink 14 and the plurality of lens modules 24*a*, 24*b*, 24*c* are movable as a single unit within the housing 20. The heat sink 14 is pivotable between position A and position B along a first common datum for adjusting the horizontal aim of the vehicle lighting assembly 10, as shown in FIG. 6. Each of position A and position B places the heat sink 14 at an angle α from the right or left of the first common datum, respectively. Similarly, the heat sink 14 is pivotable between position C and position D along a second common datum for adjusting the front angle aim of the vehicle lighting assembly 10, as shown in FIG. 7. Each of position C and position D places the heat sink 14 at an angle θ from the second common datum. The heat sink 14 is also pivotable between position G and position H along a third common datum for adjusting the vertical aim of the vehicle lighting assembly 10, as shown in FIG. 8. Each of position G and position H places the heat sink 14 at an angle δ from the third common datum. When the movement along the first, second, and third common data is combined, the heat sink 14 may be adjusted within the housing 20 to a calibration position to calibrate the low-beam pattern 190 (FIG. 10) to meet the low-beam pattern requirements as set forth in the current U.S. National Highway Traffic Safety Administration (NHTSA) Federal Motor Vehicle Safety Standard 108. The positioning of the plurality of lens modules 24a, 24b, 24c within the heat sink 14 and housing 20 allow the entire vehicle lighting assembly 10 to be calibrated with respect to the low-beam pattern 190 (FIG. 10) while still maintaining the necessary calibration for the high-beam pattern 200 (FIG. 11) to meet the high-beam pattern requirements as set forth in current U.S. NHSTA Federal Motor Vehicle Safety Standard 108.

Referring now to FIGS. 9-12, various vehicular light patterns 180, 190, 200 that may be produced by the vehicle lighting assembly 10 are shown as well as an option to activate an illuminated marker 210 and/or an illuminated turn signal 220. When the daytime running light (DRL) pattern 180 is in use as shown in FIG. 9, the first, second, and third lens modules 24a, 24b, 24c are collectively illuminated at a DRL intensity by the respective LED light sources 28 (see FIG. 3). The resulting daytime running light pattern 180 is a light beam pattern at approximately 60 times lower than the low-beam pattern and configured illuminate forward of the vehicle 50 when the vehicle 50 is running. When the low-beam pattern 190 as shown in FIG. 10, only the first and second lens modules 24a, 24b are illuminated. The first and second lens modules 24a, 24b are illuminated at a full low-beam intensity by the respective LED light sources 28 (see FIG. 3). In some examples, the third lens module 24c may be illuminated at DRL intensity or lower. As discussed previously, the resulting low-beam pattern 190 conforms to the requirements for low-beam lighting as set forth in current U.S. Federal Motor Vehicle Safety Standard 108. When the high-beam pattern 200 is in use as shown in FIG. 11, the first, second, and third lens modules 24a, 24b, 24c are collectively illuminated by the LED light sources 28 (see FIG. 3) at a full high-beam intensity. As discussed previously, the resulting high-beam pattern 200 conforms to the requirements for high-beam lighting as set forth in current U.S. Federal Motor Vehicle Safety Standard 108.

The light blade 128 may be illuminated when the vehicle lighting assembly 10 is utilizing any of the previously discussed vehicular light patterns 180, 190, 200 or even when the vehicle lighting assembly 10 is unlit. When the light blade 128 is illuminated, the light blade 128 may function to produce an illuminated turn signal 220. The light blade 128 when illuminated may be used illuminated turn signal 220. In some examples, the light blade 128 may be illuminated to be used as a hazard light and/or to indicate that the vehicle 50 has been locked. It is contemplated that the light blade 128 may be illuminated in other instances without departing from the scope of the present disclosure. Similarly, the heat sink 14 may include other light blades, such the marker light blade 136, that may be illuminated separately from or in conjunction with the light blade 128.

The heat sink 14 being positioned in and movable relative to the housing 20 is advantageous as it allows a user to mechanically aim the low-beam pattern 190 and consequently aim the high-beam pattern 200 and the daytime running light pattern 180, as opposed to keeping the daytime running light pattern 180 separate from the low-beam pattern 190 and high-beam pattern 200. The heat sink 14 independently positioned in the housing 20 without the use of a conventional second bezel or housing to secure it is also advantageous. The heat sink 14 also acts as a common datum for all necessary lighting functions. This allows the heat sink 14 to be used for all heat dissipation for the light sources 28 and as a singular attachment point that sets the orientation and position of all light beam patterns 180, 190, 200 and light functions 210, 220 mounted to the heat sink 14. Additionally, the heat sink 14 and the light sources 28 and respective lens modules 24a, 24b, 24c may constitute the entirety of the inner viewable headlamp, eliminating the need for decorative bezels. This provides an increased simplicity for the vehicle lighting assembly 10 and eliminates excess parts (e.g., the decorative bezels and inner bezels).

The use of the lens modules, or optic polyhedrons, 24a, 24b, 24c is also advantageous. Manufacturers currently are required to add a separate daytime running lamp for countries that do not allow the use of the low-beam pattern 190 as the daytime running light pattern 180. Using the same lens modules 24a, 24b, 24c to produce the daytime running light pattern 180, the low-beam pattern 190, and the high-beam pattern 200 streamlines the aesthetic and prevents excess lamps on the vehicle 50. Additional functions can be added without departing from the overall assembly and movement of the heat sink 14 and housing 20. The micro-optics on the front face of the lens modules 24a, 24b, 24c also create a uniform distribution of light when illuminated at the DRL intensity or higher, resulting in a uniformly lit appearance that is desirable difficult to achieve, particularly for the daytime running light pattern.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. It should be understood that the elements may be adjusted in arrangement, particularly in positioning and number of cavities, and may be used in various lighting applications including in tail lamps, motorcycle headlights, boat headlamps, flood lights, and any other application configured to utilize lens modules to create a predefined pattern. The elements may be used in handheld applications such as flashlights or spotlights or any other application not requiring a predefined pattern, as well. The elements may be formed of other optically transparent materials providing a 0-draft or other low-draft lens module. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting assembly, comprising:
    a single heat sink defining a plurality of cavities, wherein the heat sink is within a housing;
    a plurality of optic polyhedrons configured within the cavities; and
    a plurality of LED light sources within the cavities configured to direct an incident light pattern through the optic polyhedrons to generate a plurality of vehicular light patterns,
    wherein the heat sink is pivotable along three independent datums relative to the housing to calibrate one or more of the vehicular light patterns.

2. The vehicle lighting assembly of claim 1, wherein the heat sink is configured to dissipate thermal energy from the LED light sources in both vehicle forward and rearward directions.

3. The vehicle lighting assembly of claim 1, wherein the heat sink comprises a visible outer edge that extends past the cavities vehicle forward.

4. The vehicle lighting assembly of claim 1, wherein the vehicular light patterns are a low-beam pattern, a high-beam pattern, and a daytime running light pattern.

5. The vehicle lighting assembly of claim 4, wherein the optic polyhedrons that generate the low-beam pattern and the high-beam pattern also collectively generate the daytime running light pattern.

6. The vehicle lighting assembly of claim 1, wherein each optic polyhedron comprises a front side comprising a plurality of micro-optic elements, and further wherein each micro-optic element comprises a front face having a surface area from about 0.25 millimeters squared to about 25 millimeters squared.

7. The vehicle lighting assembly of claim 1, wherein each optic polyhedron comprises a plurality of near-field lens (NFL) elements configured to collimate the incident light pattern into the vehicular light patterns.

8. The vehicle lighting assembly of claim 1, wherein the heat sink defines an open end, and further wherein a lens is disposed over the open end.

9. The vehicle lighting assembly of claim 6, wherein the optic polyhedrons and the plurality of micro-optic elements are formed of silicone.

10. A vehicle lighting assembly, comprising:
    a single heat sink defining a plurality of cavities within a housing; and
    a plurality of optic polyhedrons and corresponding LED light sources within the cavities,
    wherein the LED light sources direct incident light patterns through the polyhedrons to generate a plurality of vehicular light patterns, and the heat sink is pivotable along a plurality of independent datums relative to the housing to calibrate one or more of the vehicular light patterns.

11. The vehicle lighting assembly of claim 10, wherein the heat sink comprises a visible outer edge that extends past the cavities vehicle forward.

12. The vehicle lighting assembly of claim 10, wherein the vehicular light patterns comprise a low-beam pattern, a high-beam pattern, and a daytime running light pattern, and further wherein the optic polyhedrons that generate the low-beam pattern and the high-beam pattern also collectively generate the daytime running light pattern.

13. The vehicle lighting assembly of claim 12, wherein the low-beam pattern and the high-beam pattern meet respective the low-beam pattern requirements and high-beam pattern requirements set forth in the current U.S. National Highway Traffic Safety Administration Federal Motor Vehicle Safety Standard 108.

14. The vehicle lighting assembly of claim 10, wherein each optic polyhedron comprises a front side comprising a plurality of micro-optic elements, and further wherein each micro-optic element comprises a front face having a surface area from about 0.25 millimeters squared to about 25 millimeters squared.

* * * * *